US012577908B2

(12) United States Patent
Arndt et al.

(10) Patent No.: US 12,577,908 B2
(45) Date of Patent: Mar. 17, 2026

(54) GAS TURBINE SYSTEM, IN PARTICULAR FOR AN ELECTRICALLY DRIVEN MOTOR VEHICLE, AND MOTOR VEHICLE AND METHOD

(71) Applicants: Holger Arndt, Wetzlar (DE); Nicolas Michael Broda, Dillenburg-Manderbach (DE)

(72) Inventors: Holger Arndt, Wetzlar (DE); Nicolas Michael Broda, Dillenburg-Manderbach (DE)

( * ) Notice: Subject to any disclaimer, the term of this patent is extended or adjusted under 35 U.S.C. 154(b) by 0 days.

(21) Appl. No.: 18/711,561

(22) PCT Filed: Nov. 17, 2022

(86) PCT No.: PCT/EP2022/000104
§ 371 (c)(1),
(2) Date: May 17, 2024

(87) PCT Pub. No.: WO2023/088578
PCT Pub. Date: May 25, 2023

(65) Prior Publication Data
US 2025/0243803 A1     Jul. 31, 2025

(30) Foreign Application Priority Data

Nov. 20, 2021   (DE) .......................... 102021005758.9

(51) Int. Cl.
*F02C 3/30* (2006.01)
*F02C 6/20* (2006.01)
*F02C 7/141* (2006.01)

(52) U.S. Cl.
CPC ................ *F02C 3/305* (2013.01); *F02C 6/20* (2013.01); *F02C 7/141* (2013.01);
(Continued)

(58) Field of Classification Search
CPC ............... F02C 3/30; F02C 3/305; F02C 6/20
See application file for complete search history.

(56) References Cited

U.S. PATENT DOCUMENTS

| | | | |
|---|---|---|---|
| 3,021,673 A | 2/1962 | Mock | |
| 6,289,666 B1 | 9/2001 | Ginter | |
| (Continued) | | | |

FOREIGN PATENT DOCUMENTS

| | | |
|---|---|---|
| DE | 10205972 A1 | 10/2003 |

*Primary Examiner* — Scott J Walthour
(74) *Attorney, Agent, or Firm* — Jordan IP Law, LLC

(57)   ABSTRACT

A gas turbine system for operating an electrical generator in an electric-powered motor vehicle, comprises at least one gas turbine and a control unit. The gas turbine comprises at least one turbine wheel and at least one combustion chamber, which is provided for the combustion of a fuel-air mixture in the combustion chamber and which is in fluidic connection with the turbine wheel for channeling a gas flow out of the combustion chamber to the turbine wheel. The gas turbine comprises at least one water injection assembly, which is constructed to feed water to the gas flow. The control unit is constructed to control a quantity of water that is fed to the gas flow by means of the water injection assembly. The gas turbine is constructed to be operated in a first provided operating mode with an at least approximately stoichiometric fuel-air mixture.

17 Claims, 4 Drawing Sheets

Figure 1:
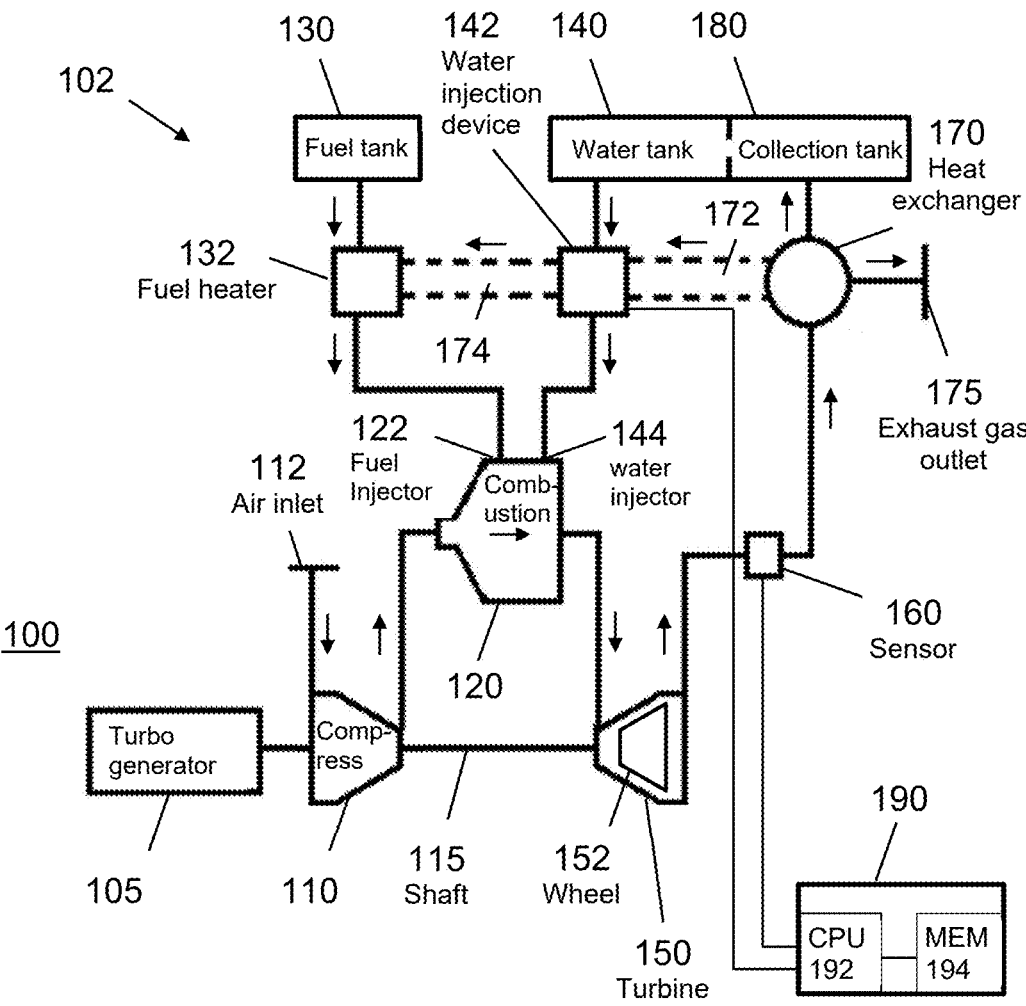

(52) U.S. Cl.
    CPC ...... *F05D 2220/76* (2013.01); *F05D 2270/08*
            (2013.01); *F05D 2270/20* (2013.01); *F05D*
        *2270/303* (2013.01); *F05D 2270/306* (2013.01)

(56)                  References Cited

U.S. PATENT DOCUMENTS

| | | | |
|---|---|---|---|
| 6,294,842 B1 | 9/2001 | Skowronski | |
| 6,751,940 B1 | 6/2004 | Paul | |
| 2011/0203291 A1* | 8/2011 | Erickson | F02C 9/28 |
| | | | 60/776 |
| 2016/0333794 A1* | 11/2016 | Baladi | F02K 1/30 |
| 2019/0023114 A1* | 1/2019 | Nguyen Huu | B60K 6/26 |

* cited by examiner

FIG 3

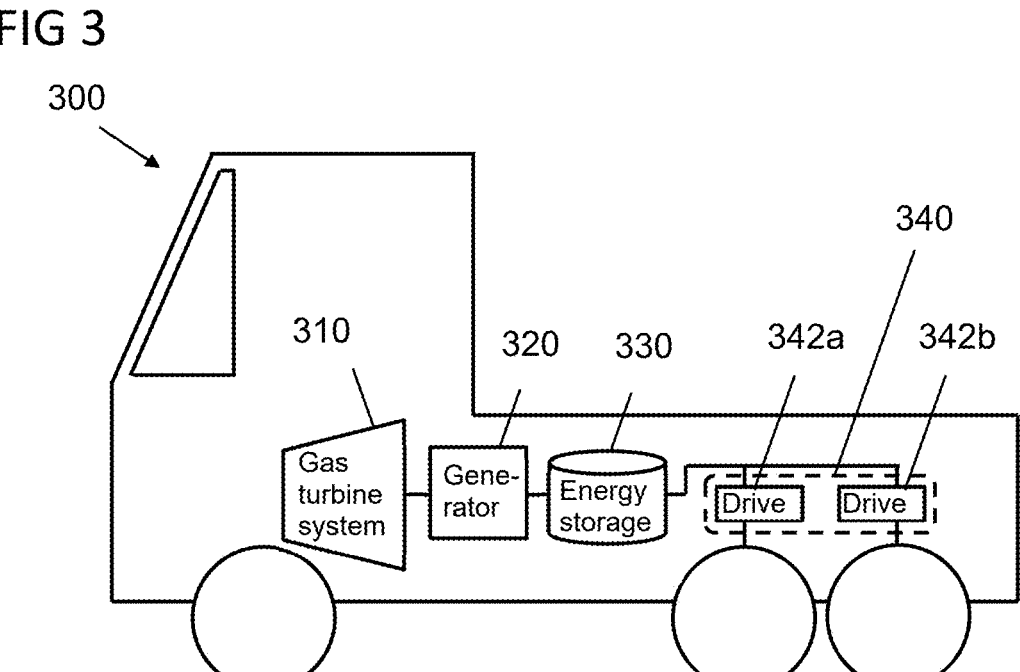

FIG 4

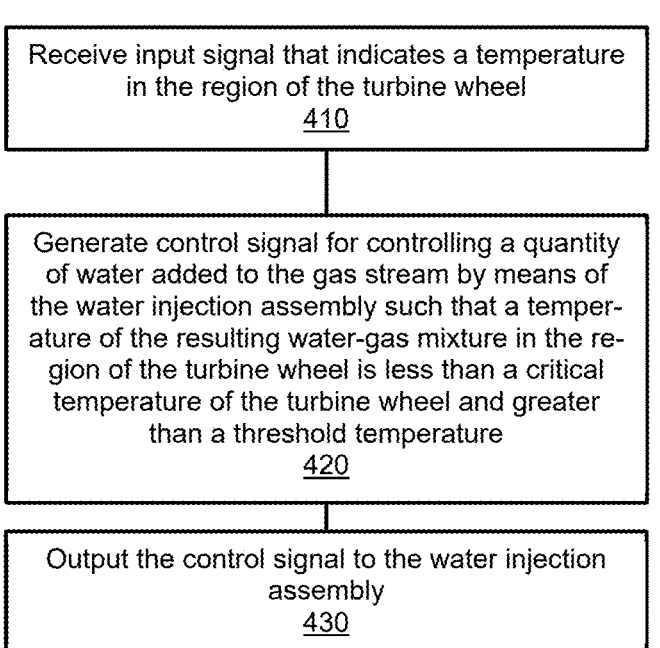

Receive input signal that indicates a temperature in the region of the turbine wheel
410

Generate control signal for controlling a quantity of water added to the gas stream by means of the water injection assembly such that a temperature of the resulting water-gas mixture in the region of the turbine wheel is less than a critical temperature of the turbine wheel and greater than a threshold temperature
420

Output the control signal to the water injection assembly
430

400

GAS TURBINE SYSTEM, IN PARTICULAR FOR AN ELECTRICALLY DRIVEN MOTOR VEHICLE, AND MOTOR VEHICLE AND METHOD

CROSS REFERENCE TO RELATED APPLICATIONS

The present application is a U.S. National Phase Patent Application, which claims the benefit of priority to International Patent Application No. PCT/EP2022/000104 filed on Nov. 17, 2022, which itself claims the priority of German Patent Application No. 10 2021 005 758.9 filed on Nov. 20, 2021, which are each hereby incorporated by reference in their respective entireties.

The invention relates to a gas turbine system, in particular for operating an electric generator in an electric-powered motor vehicle, according to the preamble of claim 1. The invention further relates to a motor vehicle comprising such a gas turbine system, as well as to a method for operating a gas turbine system and a computer program product.

The development of lower-emission drives, especially for passenger cars, trucks, commercial vehicles, and machines, is progressing in many places with increasingly strict limits on emissions. Challenges have arisen especially with regard to commercial vehicles, such as trucks and construction and agricultural machines. In particular, due to their increased energy requirements, electromobility concepts such as battery-powered vehicles are currently not an alternative to diesel engines. In the field of commercial vehicles, diesel engines typically have efficiency factors of 45-48% and are thus relatively efficient in comparison to passenger car engines. The theoretically achievable efficiency factor has almost been reached. Therefore, it is also no longer possible to expect a significant increase in efficiency.

It is further known that gas turbines often have combustion processes with lower emissions than piston engines. The electrical efficiency factor of conventional micro-gas turbines like those used, for example, in stationary combined heat and power plants, however, is only in the range of 25-35%. Especially for mobile applications, such an efficiency factor is too low to serve as an alternative to conventional combustion engines.

In combustion engines, it is also desirable to have a combustion process with a fuel-air mixture that is ideal with respect to the efficiency factor. This is often the case for a so-called stoichiometric mixture, where all the components are chemically converted during combustion of this mixture. In gas turbines, however, this typically leads to overheating. Therefore, gas turbines are usually operated with a very lean fuel-air mixture, in order not to exceed a critical temperature due to a flow of hot exhaust gas entering into the actual turbine. The critical temperature is here determined primarily by the temperature resistance of the turbine blades. Cooling air is provided here in the form of an increased volume of supply air that is already fed into the combustion chamber of the gas turbine. Therefore, in order to provide the turbine with sufficient cooling air, the compressor connected in line before the combustion chamber must perform a considerable amount of work for the cooling in order to also compress the air provided for cooling. This adversely affects the efficiency factor of conventional gas turbines. The critical temperature is determined by the material used for the turbine and is typically around 1200° C. Resistance to such high temperatures also places special requirements on the material and production methods being used.

The so-called Cheng process, also known as Cheng cycle or STIG (i.e., Steam Injected Gas Turbine) process, is one method for improving the efficiency factor of gas turbines that are used especially in stationary, large-scale industrial applications for providing processing heat and electrical energy. In the Cheng process, the residual heat produced in a gas turbine is also used to generate steam. This is generated in a waste heat boiler connected in line after the turbine and then fed back into the combustion chamber of the gas turbine. A mass flow increased by the addition of steam into the turbine increases the power output. The recovery of heat in the waste heat boiler can increase the efficiency factor of the gas turbine. The steam is output to the environment with the exhaust gas.

Due to high costs, the Cheng cycle is not used in continuous operation, but only for increasing power output similar to water injection in airplane turbines (see below). Therefore, the turbines used for this are not optimized for this type of operation and must be continuously monitored manually during such operation. The turbine temperatures are also very high, even despite water injection, because the exhaust gas is also used to produce processing heat. In gas-fired power plants, this process is not used, because combined gas-steam systems achieve better overall efficiency factors.

Airplane turbines differ only slightly from stationary industrial turbines in terms of construction. In airplane turbines, the mechanical work is not used for driving a generator, but instead for operating an air scoop. Here, the flow of exhaust gas also generates additional propulsion. Since the 1960s, there have been airplane turbines in which water is injected into the turbines for short-time increase in power output. Here, the water is injected only for a short time, in order to cool the turbine and to be able to use a richer air-fuel mixture without damaging the turbine. In this way, the power output of the turbine is increased as necessary for the duration that the water is added.

The efficiency factor of airplane turbines, however, decreases significantly when water is introduced, because the enthalpy of vaporization of the water must first be applied to the turbine and the turbines are also not designed for an increased mass flow. As a result, an increased mass flow passes through the turbine without doing any work. In addition, pollutant emissions increase significantly during the combustion process when water is added.

In contrast, micro-gas turbines have been used for a long time for stationary energy production. In combined heat and power plants, they achieve electrical efficiency factors of 25-35%. Here, the main objective is to provide processing heat. These turbines are significantly more compact than those in gas-fired power plants, because they operate with radial compressors and turbines. Micro-gas turbines operate with relatively low compression ratios of 1:4 to 1:10. To increase the efficiency factor, the combustion air is often preheated after the compressor by a recuperator. In this way, less fuel is needed to reach the maximum turbine inlet temperature.

Due to the operating mode described above, however, known micro-gas turbines run especially "lean," i.e., with a relatively high proportion of air in the fuel-air mixture. Therefore, the compressor requires increased power output, which significantly reduces the efficiency factor of such turbines.

The problem forming the basis of the invention is to create a space-saving drive solution with high efficiency factor and low pollutant emissions, especially for mobile applications.

This problem is solved by providing the gas turbine system with a control unit with the features of claim 1. Refinements of the invention are specified in the dependent claims.

According to these features, a gas turbine system with at least one water injection assembly designed to add water to the gas stream is provided. The control unit is designed to control a quantity of water added to the gas stream by means of the water injection assembly. The gas turbine is further designed to be operated in a first intended operating mode with a first fuel-air mixture, wherein the gas stream generated thereby has a temperature suitable to produce a temperature in the region of the turbine wheel which is greater than a critical temperature of the turbine wheel. The control unit is designed to control the quantity of water in such a way that the temperature of the water-gas mixture generated by this process in the region of the turbine wheel is less than the critical temperature of the turbine wheel and greater than a threshold temperature.

A water injection area of the water injection assembly can be arranged with respect to the combustion chamber in such a way that the gas flow in the water injection area at least predominantly no longer contains any burning components of the fuel-air mixture.

The first fuel-air mixture can be at least approximately stoichiometric. The at least approximately stoichiometric fuel-air mixture can be created such that the mass fraction of any component of the mixture deviates by at most 50%, advantageously at most 30%, preferably at most 15%, particularly preferably at most 5% from a stoichiometric mass fraction of the respective component.

The threshold temperature can be at least partially determined by a temperature required to preheat the fuel for the gas turbine. In addition or as an alternative, the threshold temperature can be at least partially determined by a temperature required to preheat water by means of the water injection assembly. The threshold temperature can also be at least partially determined by a temperature required to operate an exhaust gas cleaning device of the gas turbine system.

The gas turbine system can comprise at least one sensor that is designed to detect at least one measurand that indicates a temperature in the area of the turbine wheel. Here, the control unit can be designed to control the quantity of water at least partially on the basis of the detected measurand.

The at least one sensor can comprise a temperature sensor that is arranged in the area or in line after the area of the turbine wheel. Alternatively, the temperature sensor can be arranged in line before the turbine wheel between an exhaust gas purification device, in particular an exhaust gas catalytic converter, and the turbine wheel. In this case, the control unit can be designed to control the quantity of water at least partially on the basis of a temperature detected by the temperature sensor. In addition or as an alternative, the at least one sensor can comprise an oxygen sensor and/or a nitrogen oxide sensor, and the control unit can be designed to control the quantity of water at least partially on the basis of a signal from the oxygen sensor and/or the nitrogen oxide sensor. A signal from the oxygen sensor and/or the nitrogen oxide sensor can indicate at least one characteristic of a combustion process in the combustion chamber that is technically related to the temperature in the region of the turbine wheel. In addition or as an alternative, the control unit can be designed to further control the quantity of water based at least in part on a fuel flow rate of the gas turbine, a mixing ratio of a fuel-air mixture with which the gas turbine is operated, a composition of the exhaust gas, and/or a pressure within the combustion chamber.

The control unit can also be designed to control the quantity of water in such a way that the efficiency factor of the gas turbine is optimized, in particular maximized, depending on the quantity of water. The efficiency factor of the gas turbine can be optimized, in particular maximized, in relation to at least one processing parameter of an operating process in the combustion chamber. The control unit can also be designed to control the quantity of water for optimizing, in particular for maximizing, the efficiency factor at least partially on the basis of the at least one processing parameter of the operating process.

The optimized efficiency factor can correspond to an efficiency factor in the range of at least 84%, advantageously at least 90%, preferably at least 94%, more preferably at least 98% of the maximum efficiency factor. The efficiency factor can also be optimized with respect to at least one design requirement and/or at least one operating requirement of the gas turbine.

According to another aspect, a motor vehicle is provided. The motor vehicle comprises a gas turbine system of the kind presented here.

The motor vehicle can comprise at least one electric drive and one electric generator, which is provided to generate electricity for the at least one electric drive. The gas turbine system can be arranged to operate the electric generator.

The motor vehicle can further comprise at least one electrical energy storage device that is designed to store electrical energy generated by means of the electric generator and to supply stored electrical energy to the at least one electrical drive.

According to another aspect, a method of operating a gas turbine system of the kind presented here is provided. The method comprises receiving, by means of the control unit, at least one input signal that indicates the temperature in the region of the turbine wheel. The method further comprises generating, by means of the control unit, a control signal for controlling a quantity of water added to the gas stream by means of the water injection assembly such that a temperature of the water-gas mixture generated by this process in the region of the turbine wheel is less than the critical temperature of the turbine wheel and greater than a threshold temperature. The method further comprises outputting, by means of the control unit, the control signal to the water injection assembly.

According to another aspect, a computer program product is provided. The computer program product comprises portions of program code that, when executed on a processor device of a control unit of a gas turbine system, cause the control unit to perform the method of the kind disclosed here.

Figure 2:
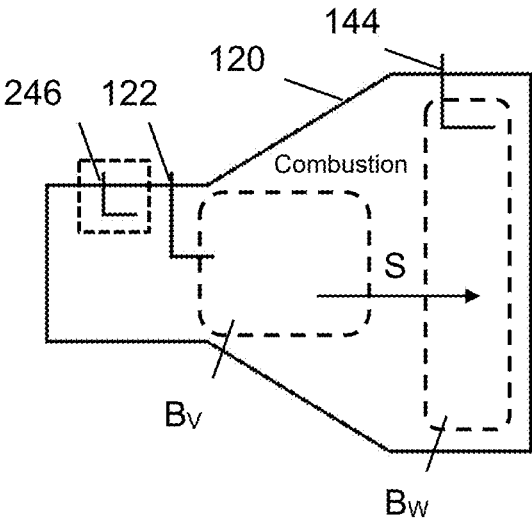
Figure 5:
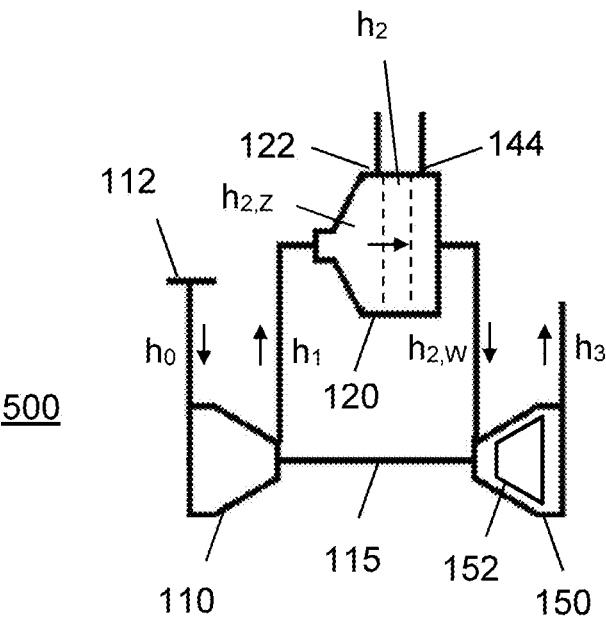
Figure 6:
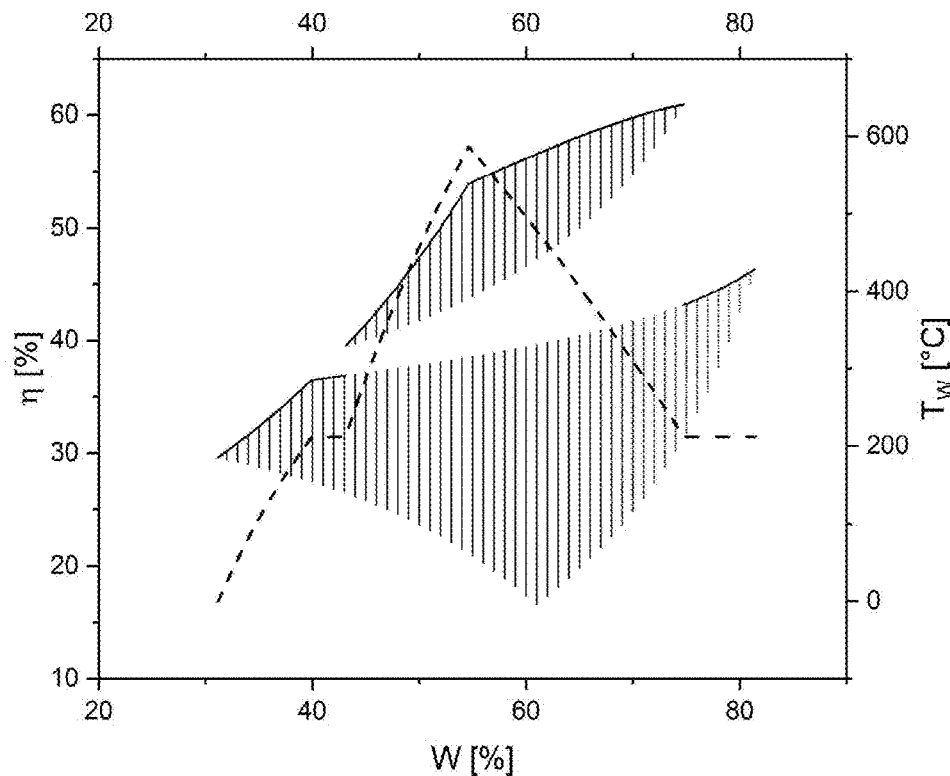
Figure 7:
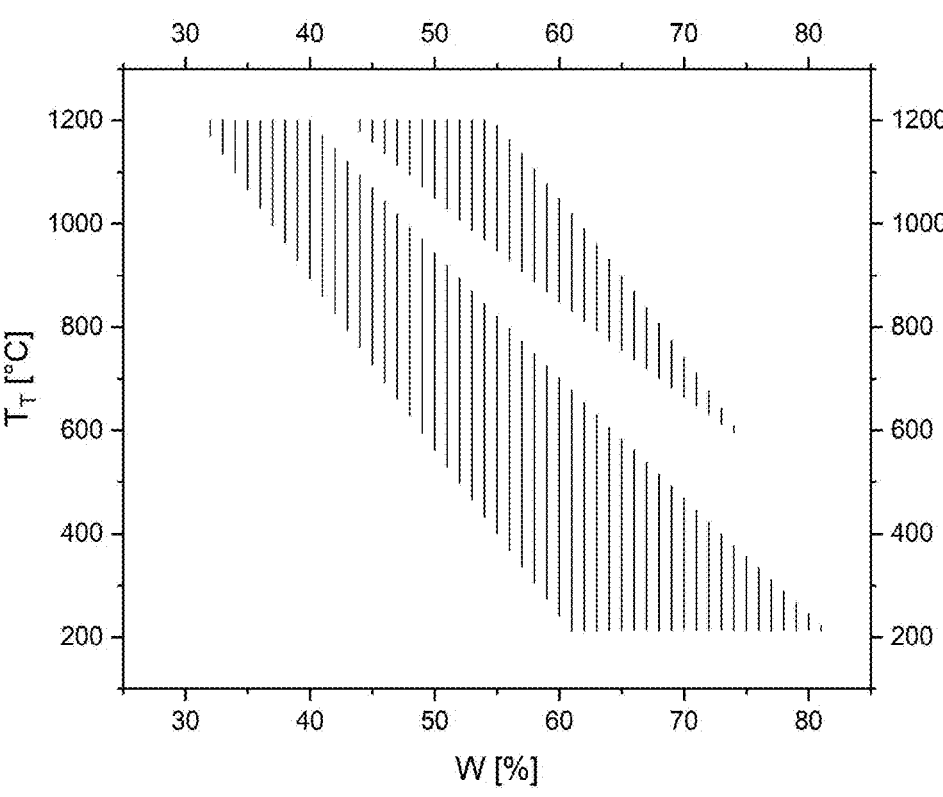

The invention will be explained in more detail below using embodiments with reference to the figures. Shown are:

FIG. 1 a gas turbine system according to one embodiment;

FIG. 2 a combustion chamber of the gas turbine system from FIG. 1;

FIG. 3 a motor vehicle with a gas turbine system according to another embodiment;

FIG. 4 a method for operating a gas turbine system according to another embodiment;

FIG. 5 an enthalpy diagram for a gas turbine system according to one example; and FIGS. 6 and 7 state diagrams for a process in a gas turbine system.

FIG. 1 shows schematically and as an example a gas turbine system 100 with a gas turbine 102 and a control unit 190 connected so that it can communicate with the turbine. The gas turbine 102 comprises a turbogenerator 105, a compressor 110, and a turbine 150 with a turbine wheel 152 arranged therein. The turbogenerator 105, the compressor 110, and the turbine 150 are arranged along a shaft 115 and connected thereto. The gas turbine 102 further comprises a combustion chamber 120. For illustration purposes, the combustion chamber 120 is shown above the shaft 115 in FIG. 1. In some examples, this corresponds schematically to one design of the gas turbine 102. In other typical embodiments of the gas turbine 102, however, the combustion chamber 120 is also arranged along the shaft 115. As shown by the arrows and the lines provided with arrows in the area of the aforementioned components in FIG. 1, the compressor 110, the combustion chamber 120, and the turbine 150 are in fluidic connection with one another. In particular, they form parts of a flow path that, starting from an air inlet 112 of the gas turbine, extends via the compressor 110 through the combustion chamber 120 to the turbine 150. The supply air is compressed in the compressor 110. The compressed supply air is used for a combustion process that takes place in the combustion chamber 120. The gas flow, which subsequently contains the exhaust gas from the combustion process, is passed to the turbine 150, where the turbine wheel 152 is in turn driven by means of the (exhaust) gas flow. From the turbine 150, the flow path extends towards an exhaust gas outlet 175.

The combustion process in the combustion chamber 120 is fed by a fuel-air mixture. For this purpose, fuel is supplied to the combustion chamber 120 via a fuel injector 122 in addition to the compressed supply air coming from the compressor 110. The fuel mixes in the combustion chamber 120 with the compressed supply air to form the fuel-air mixture, which is provided for combustion in the combustion chamber 120. In the example of FIG. 1, the gas turbine 102 comprises a fuel tank 130, from which fuel is first fed to a fuel heater 132 and from there to the fuel injector 122.

In some examples of the gas turbine 102, the arrangement of the aforementioned components and their operation, as described above, do not fundamentally differ from the arrangement and operation of corresponding components in conventional gas turbines. Furthermore, in some examples, the gas turbine 102 is designed to operate an electric generator that converts the rotation of the turbine wheel 152 into electrical energy, for example, by means of a coupling of the generator to the shaft 115. In many of these examples, an application and production required for such a gas turbine 102 do not fundamentally differ from those of conventional gas turbine-generator arrangements.

In the gas turbine 102, the combustion chamber 120 has a water injector 144 in addition to the fuel injector 122. The water injector 144 is used to add water to the gas flow. In the example shown, the water reaches the water injector 144 from a water tank 140 via a water injection device 142, in which the water is conveyed and conditioned according to the respective processing requirements, for example, vaporized and subjected to a required pressure. The water injection device 142 and the water injection 144 are parts of a water injection assembly of the gas turbine 102. The temperature of the water (present as supercritical steam in typical examples) during injection into the combustion chamber 120 is substantially lower than a processing temperature of the combustion process and a temperature of the exhaust gas stream generated by the combustion process. The water injection therefore reduces the temperature of the water (exhaust) gas mixture produced in this way compared to a temperature of the gas stream before, i.e., upstream of, the water injection. The generated water-gas mixture, or the gas stream supplied with water in this way, therefore causes less heating of the turbine 150 and in particular of the turbine wheel 152 arranged therein when passing through the turbine 150 than would be the case if the gas turbine 102 were operated without the water injection with an unchanged combustion process in the combustion chamber 120. The water injection into the gas flow thus permits in particular the use of a combustion process that conventionally, i.e. without water injection, would lead to overheating of the turbine 150.

In FIG. 1, the water injector 144 is shown schematically in line after the fuel injector 122. This corresponds to a preferred mode of operation of the gas turbine 102, in which the combustion process taking place within the gas stream is at least largely completed before water is supplied to the gas stream via the water injector 144. This is advantageous in terms of a "clean" combustion process, in which as few pollutants as possible are formed and released. However, a spatial arrangement of the water injector 144 with respect to the combustion chamber 120 in line after an arrangement of the fuel injector 122 is not necessary in all examples of the gas turbine 102. Instead, the arrangement of the water injector 144 for the described purpose is dependent on fluid dynamic processes, in particular the flow behavior within the combustion chamber 120, which may differ in individual embodiments of the gas turbine 102. Conversely, due to the relatively high temperature of the combustion process in the intended modes of operation of the gas turbine 102, rapid cooling by the water injector is advantageous or necessary to protect the material of the combustion chamber. In some examples, for this purpose the water injection also takes place in such a way that the flow of injected water at least partially envelops a combustion volume within the combustion chamber opposite the combustion chamber wall before the water and exhaust gas flow are mixed together.

The gas turbine 102 also comprises a sensor 160. In the example of FIG. 1, the sensor 160 is arranged in the path of flow on the outlet side of the turbine 150. In other examples of the gas turbine 102, the sensor 160 is arranged differently, for example in the area of the turbine 150. The sensor 160 is configured to detect a measurand that indicates the temperature in the region of the turbine 150. For example, the sensor 160 comprises a temperature sensor that detects a temperature downstream of the turbine or in the area of the turbine 150. In other examples of the gas turbine 102, the sensor 160 comprises a different sensor or additional sensors, for example an oxygen sensor in the exhaust gas flow, which provide signals that, possibly with the addition of other processing parameters, such as the fuel flow rate, allow conclusions to be made about the temperature in the region of the turbine 150. The measurand(s) and the other processing parameter(s) allow, for example, conclusions to be made about the combustion process in the combustion chamber 120, which in turn allows conclusions to be made about the resulting temperature in the area of the turbine 150. The sensor 160 is connected so that it can communicate with the control unit 190. The sensor 160 is designed to output sensor signals to the control unit 190.

The control unit 190 comprises a processor device 192 and a memory device 194 connected to the processor device. The control unit 190 is also connected so that it can communicate with the water injection device 142. The control unit 190 is designed to receive sensor signals from the sensor 160 and to determine control signals for the water injection device 142 at least partially on the basis of the received sensor signals and to output these control signals to the water injection device 142 in order to control one or more functions of the water injection device 142.

The control unit 190 controls a quantity of water which is supplied to the gas flow by means of the water injection device 142 via the water injector 144. The quantity of water supplied to the gas flow is thereby controlled in such a way that the water-gas mixture produced by this process has a temperature that, when the gas flow is passed on to the turbine 150, causes a temperature in the region of the turbine 150 that is less than a critical temperature of the turbine 150, i.e., less than the maximum temperature at which operation of the turbine 150 is intended or is possible without causing damage to the turbine 150. Typically, the critical temperature is determined by the heat resistance of the turbine wheel blades. For the purpose described, the control unit 190 is designed to determine a corresponding control signal on the basis of a sensor signal received from the sensor 160 and, if necessary, from additional operating or processing parameters of the gas turbine 102, which together indicate the temperature in the area of the turbine 150, and to output this signal to the water injection device 142.

The control unit 190 also controls the quantity of water supplied by the water injection device 142 such that the resulting temperature in the region of the turbine 150 does not fall below a predetermined threshold temperature. As explained in more detail below, the gas turbine 102 is designed to use the heat contained in the gas stream after the turbine wheel 152 to heat the fuel and/or the water for subsequent combustion and/or water injection processes. For this purpose, the control unit 190 controls the quantity of water such that the water injection does not cause the temperature of the gas flow when it exits the turbine 150 to fall below the temperature required for these work processes.

The gas turbine 102 also comprises a heat exchanger 170, which is arranged in the path of flow in line after the turbine 150. The heat exchanger 170 is designed to extract heat contained in the gas flow for preheating fuel and/or injection water. In this case, heat extracted from the gas flow by means of the heat exchanger 170 is supplied to the fuel heater 132 and/or the water injection device 142 by means of a heating circuit 172, 174. In the example of the shown gas turbine 102, the heating circuit 172, 174 extends via a first heating circuit segment 172 to the water injection device 142 and via a second heating circuit segment 174 to the fuel heater 132. In different examples of the gas turbine 102, the heating circuit is designed to preheat only one of the operating fluids, i.e., the fuel or the injection water. In this case, the heating circuit extends only to either the fuel heater 132 or the water injection device 142. The residual heat remaining in the gas flow corresponds to a temperature below the dew point. This allows at least some of the previously injected water to be recovered from the gas flow after passing through the heat exchanger 170. The water recovered in this way is collected in a collection tank 180 and from there fed back to the water tank 140 for further injection processes. The exhaust gas flow exits the gas turbine 102 via an outlet 175.

FIG. 2 shows schematically and as an example an enlarged view of the combustion chamber 120. This is, for example, the combustion chamber 120 from one of the examples described above in connection with FIG. 1. As described above, the combustion chamber 120 has a fuel injector 122 and a water injector 144. The fuel injector 122 and the water injector 144 each comprise, for example, one or more nozzles that can inject fuel or water into the interior of the combustion chamber 120. As shown schematically in FIG. 2, in preferred examples a water injection area $B_W$, where the gas flow mixes with the injected water, is arranged in a position downstream in the flow direction S of the gas flow with respect to a combustion area $B_V$ of the combustion chamber, where the fuel-air mixture combusts in conventional operating states of the gas turbine. As a result, the gas flow in the water injection area $B_W$ no longer contains, at least predominantly, any burning components of the fuel-air mixture. For example, in the intended operating states of the gas turbine, a combustion process is at least 60%, advantageously at least 80%, preferably at least 90%, more preferably at least 95% complete before the resulting (exhaust) gas flow enters the water injection area $B_W$. The combustion process is complete, for example, when all the fuel components that can be converted during the combustion process have been converted in the gas stream. The values mentioned above for the percentage of the combustion process apply, for example, in relation to a total amount of fuel to be converted during the combustion process. In other examples, the above values apply to the percentage of the combustion process in relation to an amount of fuel to be converted in the combustion process in each of several partial streams of the gas stream. For example, different partial streams can correspond to different areas of a cross-sectional profile of the gas stream.

In some embodiments of the combustion chamber 120, a primary water injector 246 is also provided in line before the fuel injector 122. Primary water injectors in line before the combustion process are known to reduce the formation of certain pollutants through the targeted addition of a (relatively small) quantity of water to the combustion process. This process relates to nitrogen oxides, for example. The quantity of water to be added by the primary water injector 246 to minimize such pollutants, however, is typically small compared to the quantity of water to be added by the water injector 144 during the intended operating states of the gas turbine system 100.

In some examples, the quantity of water supplied by means of the primary water injector 246 is also controlled by the control unit 190. For this purpose, the control unit 190 receives, for example, a signal from the sensor 160, which in this case comprises, for example, a nitrogen oxide sensor, indicating an amount of nitrogen oxide in the exhaust gas stream. The control unit 190 is designed, for example, to determine a total quantity of water to be supplied to the gas flow by means of the water injector 144 and the primary water injector 246. Based at least in part on the signal from the nitrogen oxide sensor, the control unit determines the proportion of the total quantity of water to be supplied by means of the primary water injector 246. A control signal corresponding to the remaining portion of the total quantity of water, on the other hand, is output to the water injection device 142 for injecting the corresponding quantity of water by means of the water injector 144. In some examples, the primary water supply is also provided by the water injection device 142, which is also connected to the primary water injector 246 for this purpose. In other examples of the gas turbine system 100, the primary water injector is not controlled by the control unit 190. Here, in some embodiments, for example from a separate primary water controller, the control unit 190 receives a signal that indicates the amount of supplied primary water, and the control unit 190 determines the quantity of water to be supplied to the gas stream by means of the water injector 144 based on the difference between an intended total quantity of water and the amount of supplied primary water.

In the gas turbine system 100, the increased supply air used in conventional gas turbines to cool the turbine as an additional volume of the gas flow is at least partially replaced by the injection of water, typically in the form of supercritical steam. The water is essentially added to the gas flow after combustion. The power required to introduce the water, including conditioning the water in terms of temperature and/or pressure, is considerably lower than the power required to cool the turbine system to the same extent with air, where this required power would have to be provided as increased compressor power in order to compress a corresponding additional volume of supply air. This makes it easier to realize a high efficiency factor for the gas turbine system 100. The water supplied to the gas flow also increases the mass flow through the turbine and thus also has a beneficial effect on the efficiency factor of the gas turbine system 100.

The cooling of the exhaust gas flow by means of the described water injection assembly independently of, and in particular after, the combustion process also allows at least partial decoupling of the cooling process from the fuel-air mixture used for combustion. This in turn allows the use of significantly richer, i.e., lower proportion of air, fuel-air mixtures than is the case with conventional turbines. In particular, the gas turbine system 100 is designed to be operated permanently with a stoichiometric fuel-air mixture. Compared to conventional gas turbines operated with considerably leaner mixtures, a combustion process with a stoichiometric mixture has the advantage of a considerably higher efficiency factor. In the gas turbine system 100, the resulting higher temperature of the produced exhaust gas, which precludes operation in conventional turbines, is reduced by means of subsequent water injection to such an extent that the resulting temperature in the turbine 150 and in particular in the region of the turbine wheel 152 is below a critical temperature of the turbine wheel 152.

The described water injection also allows the gas flow to be cooled in such a way that a considerably lower temperature is present in the area of the turbine 150, even when the gas turbine 102 is operated in a high power range, than is the case with conventional gas turbines, in which temperatures usually up to 1200° C. are present in the area of the turbine. As a result, the gas turbine system 100 permits the use of more favorable and easier to process materials, since these only have to meet lower requirements with respect to critical temperatures. In configurations of the gas turbine system 100, efficiency factors of more than 60% can theoretically be achieved even at a relatively low turbine inlet temperature of around 600° C. The gas turbine system 100 also makes possible a compact design. This makes the gas turbine system 100 particularly suitable as part of a gas turbine-generator arrangement for generating electricity in electric-powered vehicles, advantageously trucks or other commercial vehicles, ships, construction machines, or portable emergency power generators.

The injection of water after the combustion process also means that the combustion process is at least not significantly impaired by the injected quantity of water. In particular, this prevents increased pollutant emissions, which occur with known turbine arrangements in the event of increased water addition.

The arrangement of combustion area $B_V$ and water injection area $B_W$ shown in FIG. 2 are schematic simplifications for easier illustration. In particular, in FIG. 2, the combustion area By and the water injection area $B_W$ are shown as contiguous areas; in addition, in the representation of FIG. 2 the combustion area By and the water injection area $B_W$ extend completely in separate normal planes with respect to the flow direction S. However, it is to be understood that for the described purpose, different shapes and/or arrangements of the combustion area By and/or the water injection area $B_W$ may also be present. In particular, if the fuel injector 122 and/or the water injector 144 are implemented in the form of a plurality of nozzles arranged spatially separated from one another, the combustion area $B_V$ and/or the water injection area $B_W$ can be formed in some examples from a plurality of separate sub-areas, within which the combustion process and/or the mixing of the gas flow with injected water takes place for part of the gas flow.

Furthermore, in some examples, in relation to a cross-sectional profile of the gas flow, mixing of the gas flow with injected water occurs at least partially further upstream or downstream in some areas than in other areas. For example, the combustion area By and the water injection area $B_W$ extend at least partially within the same normal plane. In some examples, the combustion process is also further advanced in some areas of the gas flow than in other areas when the respective parts of the gas flow enter into the water injection area $B_W$. The aforementioned values for the progress of the combustion process when the gas flow enters into the water injection area $B_W$ refer, for example, to an entire combustion process, i.e., a total of the fuel proportions to be converted during the combustion process, or with respect to an average value. This applies, for example, regardless of the geometry of the combustion area By and the water injection area $B_W$.

In contrast to known gas turbines that provide short-term water injection, the gas turbine system 100 is particularly designed for continuous water injection operation. For this purpose, the control unit 190 is designed such that it continuously controls the quantity of water supplied and, in some examples, other processing parameters, such as the temperature or pressure of the water supplied, on the basis of a continuous detection of the temperature in the area of the turbine 150 or other variables, possibly in combination with each other, indicating the temperature in the area of the turbine 150.

In some examples, the control unit 190 is also used to detect or determine parameters that are used to control the combustion process in the combustion chamber 120 and a resulting temperature in the area of the turbine 150. In some examples of the gas turbine system 100, the control unit 190 is also designed to control a fuel supply to the combustion chamber 120. In some examples, the gas turbine system 100 can extensively control the combustion process as well as the corresponding water injection in accordance with an optimized, for example maximum, efficiency factor for the respective configuration of the gas turbine 102, including an inlet temperature of the gas flow into the turbine 150 with the goal of recovering the injection water and/or heat in the exiting gas flow for preheating fuel and/or injection water. The control of fuel and possibly water injection by means of the control unit 190 is carried out, for example, on the basis of characteristic maps which are stored in the memory device 194 and which can be read by the processor device 192, and/or on the basis of continuous calculation according to thermomechanical laws and the boundary conditions given by the respective configuration of the gas turbine 102. These can also be stored at least partially in the memory device 194 and read by the processor device 192 for the respective calculations.

In the aforementioned applications, the measurands detected by the sensor 160 and, in some examples, by other sensor devices include, for example, an inlet-side air mass flow in the region of the air inlet 112, an exhaust gas temperature in the region of the exhaust gas outlet 175, the temperature in the region of the turbine 150, the water mass flow entering the combustion chamber 120, pressure and temperature of the injection water, an exhaust gas composition, in particular a nitrogen oxide concentration in the region of the exhaust gas outlet 175, power and speed of the turbine, and in some examples, additional variables and gas flow compositions determining and/or resulting from the operation of the gas turbine 102.

In some of the aforementioned examples, the gas turbine system 100 permits improved operation of the gas turbine 102 in terms of efficiency factor not only at a nominal speed of the gas turbine 102, but also in partial load ranges. This is particularly advantageous for mobile applications and also allows the lowest possible pollutant emissions to be set during such operation. In some examples, the exhaust gas temperature is set so that it corresponds at least to the temperature required to operate an exhaust gas purification device of the gas turbine system, for example the starting temperature of an existing exhaust gas catalytic converter, a particulate filter, or SCR (i.e., selective catalytic reduction) catalytic converter.

In some examples of the gas turbine system 100, an exhaust gas sensor, for example an oxygen sensor or lambda probe, is provided. The signal of this sensor can be used to check the fuel mass flow and adjust it with regard to the fuel-air ratio. This makes it possible, for example, to compensate for effects caused by fluctuating fuel qualities, such as those that occur primarily with so-called LPG, i.e., liquefied petroleum gas.

In some examples, the gas turbine system 100 is provided as part of a power generation system in an electric-powered motor vehicle that is further configured for hybrid operation. Here, the control unit 190 is designed, for example, to monitor the state of charge of a battery and/or the recuperation energy of a brake of the vehicle and to control the power of the gas turbine 102 accordingly in order to prevent overcharging of the battery.

According to the above, in some examples, the control unit 190, in combination with a corresponding configuration of the sensor 160 and possibly other sensors of the gas turbine 102 and possibly other input variables determining the operation of the gas turbine 102, allows the supplied quantity of water to be determined by means of calculations or characteristic maps in order to optimize, for example, maximize, an efficiency factor of the gas turbine 102 for the respective specified conditions. An example of such a calculation is presented below with reference to FIG. 5.

An optimized efficiency factor does not necessarily have to correspond to the maximum efficiency factor. As described below in connection with FIG. 6, a particularly advantageous embodiment of the invention is based on the realization that the maximum efficiency factor can be achieved by using only recovered exhaust gas heat to preheat both the supplied quantity of water and the fuel. On the other hand, an efficiency factor optimized for the respective requirements of the design or operation of the gas turbine 102 may be some-what lower than the maximum possible efficiency factor. For example, certain applications may be designed to use electrical heating to supply heat for preheating the fuel instead of or in addition to using heating from recovered exhaust gas. Such deviations from an ideal operation of the gas turbine 102 may be advantageous, for example, to stabilize an operation of the gas turbine 102 under changing external conditions or to simplify or adapt a design of the gas turbine 102 according to requirements.

However, such an efficiency factor of the gas turbine 102 optimized according to the design or operating requirements also corresponds, for example, to at least 84%, advantageously at least 90%, preferably at least 94%, more preferably at least 98% of the maximum efficiency factor of the gas turbine 102. An efficiency factor of the gas turbine 102 in any of these ranges results, for example, in operation with an injected preheated quantity of water above the critical point, as described below in connection with FIG. 6.

FIG. 3 shows schematically and as an example a motor vehicle 300 with a gas turbine system 310. The gas turbine system 310 is provided as part of a drive section of the vehicle 300. The gas turbine system 310 is, for example, a gas turbine system according to one of the examples of the gas turbine system 100 described above.

The gas turbine system 310 is designed to operate an electric generator 320 in the motor vehicle 300. The electrical energy generated by the generator 320 is then stored in an electrical energy storage device 330 of the motor vehicle 300. The electrical energy stored in the electrical energy storage device 330 is then used for operating an electrical drive arrangement 340 of the motor vehicle 300. In the example shown, the electric drive arrangement 340 comprises a plurality of electric drives 342a, 342b. In the example shown, the electric drives 342a, 342b of the drive arrangement 340, which are each for example, an electric motor, are assigned to different wheels or different axles of the motor vehicle 300.

The above example describes the use of a gas turbine system of the presented type as part of a drive solution for a motor vehicle. However, the described gas turbine system can also be used advantageously in other applications. Example applications include power generators, e.g., for construction machines, such as compressors for jackhammers, etc. Additional examples include stationary applications of the gas turbine system, e.g., for autonomous living independent of electricity providers or as a supplement to solar-energy systems as a small-scale power generator.

FIG. 4 shows a flow diagram of a method 400 for operating a gas turbine system as described above. The gas turbine system here comprises at least one gas turbine and at least one control unit, wherein the gas turbine comprises at least one turbine wheel, at least one combustion chamber that is designed to burn a fuel-air mixture in the combustion chamber and that is fluidically connected to the turbine wheel for directing a gas flow from the combustion chamber to the turbine wheel, and at least one water injection assembly that is designed to add water to the gas flow. A water injection area of the water injection assembly is arranged in relation to the combustion chamber in such a way that the gas flow in the water injection area no longer contains at least approximately any burning components of the fuel-air mixture. In addition, the gas turbine is designed to be operated in a first intended operating mode with an at least approximately stoichiometric fuel-air mixture. The resulting gas flow has a temperature that is suitable for producing a temperature in the area of the turbine wheel that is greater than a critical temperature of the turbine wheel.

The method 400 comprises receiving, by means of the control unit, at least one input signal that indicates the temperature in the region of the turbine wheel, step 410. The method 400 further comprises generating, by means of the control unit, a control signal for controlling a quantity of water added to the gas stream by means of the water injection assembly such that the temperature of the resulting water-gas mixture in the region of the turbine wheel is less than the critical temperature of the turbine wheel and greater than a threshold temperature, step 420. The method 400 further comprises outputting, by means of the control unit, the control signal to the water injection assembly, step 430.

With reference to FIG. 5, a brief example calculation for the operation of a gas turbine system according to one of the examples above is presented below. The example calculation is suitable, in identical form or after being adapted to modified application conditions, for use as the basis for a method for operating a gas turbine system, in particular for controlling processing variables with an optimized efficiency factor according to one of the above examples.

FIG. 5 shows a diagram 500 in which different enthalpy values h1, h2, Z, h2, h2, W, h3 are assigned to different sections of the flow path through parts of a gas turbine system. The same reference symbols as in FIG. 1 denote the same components of a gas turbine system. The following calculation is based on a preferred use of the gas turbine system for operating an electric generator in an electric-powered motor vehicle and with the use of the preferred $CO_2$-neutral fuel ammonia. However, the calculation can also be performed analogously for other fuels. The operating parameters are selected for the intended application using the formulas described below. The calculation is also performed for an advantageous stoichiometric fuel-air mixture and a typical combustion chamber internal pressure of 1000 kPa and corresponding ammonia and water injection pressures of 2000 kPa.

The electrical power, $P_{el}$, of the gas turbine-generator arrangement is calculated according to the following equation 1 from the efficiency factor of the generator, $\eta_{Generator}$, the mechanical efficiency factor of the arrangement, $\eta_{mechanical}$, the turbine power, $P_T$, and the compressor power, $P_V$:

$$P_{el} = \eta_{Generator} \cdot \eta_{mechanical} \cdot (P_T - P_V) \tag{1}$$

The turbine power $P_T$ and the compressor power $P_V$ are calculated from the mass flow of exhaust gas mixed with water, ṁRG, W, the mass flow of combustion air, $\dot{m}_L$, and the difference in enthalpy, $\Delta h$, between different states. A distinction is made between the following states, as shown in FIG. 5 for correspondingly labeled enthalpy values $h_1$, $h_{2,Z}$, $h_2$, $h_{2,W}$, $h_3$:

0: before the compressor 110,
    1: after the compressor 110 and before the addition of fuel 122,
    2,W: after the ignition and the addition of water 144 and before the turbine 150,
    3: after the turbine 150.

For the calculation, the following additional states are also assumed:

2,Z: after the addition of fuel 122 and before the ignition,
    2: after the ignition and before the addition of water 144.

The electrical power output, $P_{el}$, is given from the following equation 2:

$$P_{el} = \eta_{Generator} \cdot \eta_{mechanical} \cdot (\dot{m}_{RG,W} \cdot (h_{2,W} - h_3) - \dot{m}_L \cdot (h_1 - h_0)) \tag{2}$$

The electrical efficiency factor, $\eta_{el}$, of the turbine is given from the ratio of output electrical power and supplied chemical power as per equation 3:

$$\eta_{el} = \frac{P_{el}}{\dot{m}_{Br} \cdot H_{Br}} \tag{3}$$

The chemical output is calculated from the mass flow rate of the fuel, $\dot{m}_{Br}$, and the calorific value of the fuel, $H_{Br}$. To burn the fuel as effectively as possible, the ideal stoichiometric fuel-air ratio, as permitted by a gas turbine system of the type presented here, is selected:

$$4NH_3 + 3O_2 \rightarrow 2N_2 + 6H_2O \tag{4}$$

The mass ratios for the ammonia fuel can be calculated from the molar ratios. The following mass ratios are determined for the ammonia fuel under standard conditions (15° C., 75% humidity) (other air components not mentioned are neglected), according to Table 1:

|        | Air    | Combustion gas | Exhaust gas |
|--------|--------|----------------|-------------|
| $NH_3$ | 0.00%  | 13.99%         | 0.00%       |
| $H_2O$ | 0.78%  | 0.67%          | 22.89%      |
| $N_2$  | 74.97% | 64.48%         | 76.00%      |
| $O_2$  | 22.96% | 19.75%         | 0.00%       |
| Ar     | 1.29%  | 1.11%          | 1.11%       |

Compression.

The combustion air has an enthalpy h0=35.2 kJ/kg under the specified standard conditions. The enthalpy of the combustion air after compression, $h_1$, can be calculated as follows according to equation 5:

$$h_1 = h_0 + \frac{1}{\eta_{i,v}} \cdot C_{p,L} \cdot T_1 \cdot \left( \left( \frac{P_2}{P_1} \right)^{\frac{k_L-1}{k_L}} - 1 \right) = 316.61 \; \frac{kJ}{kg} \tag{5}$$

Where:

$\eta_{i,V}$: isentropic efficiency factor of the compressor, assumed to be 90%, $c_{p,L}$: thermal capacity of the combustion air, assumed to be 1.05 kJ/(kg·K), $T_1$: temperature before compression, assumed to be 288.15 K, $P_1$: pressure before compression, assumed to be 100 kPa, $P_2$: pressure after compression, assumed to be 1000 kPa, $k_L$: isentropic exponent of air.

The latter is calculated from the ratios of the air components by first converting them into molar fractions, equation 6, and then using the corresponding individual values, equation 7:

$$k_L = \frac{\left( 0.0067 \cdot \frac{1}{18} \; mol \cdot k_{WaterVapor} + 0.6448 \cdot \frac{1}{14} \; mol \cdot k_{N_2} + 0.1975 \cdot \frac{1}{16} \; mol \cdot k_{O_2} + 0.0111 \cdot \frac{1}{40} \; mol \cdot k_{Ar} \right)}{0.0067 \cdot \frac{1}{18} \; mol + 0.6448 \cdot \frac{1}{14} \; mol + 0.1975 \cdot \frac{1}{16} \; mol + 0.0111 \cdot \frac{1}{40} \; mol} \tag{6}$$

-continued $$k_L = \frac{\left(0.0067 \cdot \frac{1}{18} \text{ mol} \cdot 1.3 + 0.6448 \cdot \frac{1}{14} \text{ mol} \cdot 1.36 + 0.1975 \cdot \frac{1}{16} \text{ mol} \cdot 1.34 + 0.0111 \cdot \frac{1}{40} \text{ mol} \cdot 1.67\right)}{0.0067 \cdot \frac{1}{18} \text{ mol} + 0.6448 \cdot \frac{1}{14} \text{ mol} + 0.1975 \cdot \frac{1}{16} \text{ mol} + 0.0111 \cdot \frac{1}{40} \text{ mol}} = 1.3569 \tag{7}$$

Ignition Process.

To be able to calculate the ignition process, the enthalpy of the fuel must first be calculated. In this case, the fuel is ammonia, ha, which is injected at an assumed temperature ta of 180° C., according to equation 8:

$$h_A = (T_A - T_0)c_{p,A} = 180K \cdot 2.24 \, \frac{kJ}{kg \cdot K} = 403.2 \, \frac{kJ}{kg} \tag{8}$$

Where:

$c_{P,A}$: thermal capacity of ammonia assumed to be 2.24 kJ/(kg·K)

$T_0$: 273.15 K

Using the mass fractions of ammonia and the combustion air in the fuel-air mixture produces the following as per equation 9:

$$h_z = h_a \cdot 0.1399 + h_1 \cdot 0.8601 = 327.37 \, \frac{kJ}{kg} \tag{9}$$

The combustion further increases the enthalpy as given by equation 10:

$$h_2 = h_Z + H_{Br} \cdot 0.1399 = 3447.14 \frac{kJ}{kg} \tag{10}$$

Where $H_{Br}$ is the calorific value of ammonia, 22300 kJ/kg.

It is assumed that the ignition completely combusts ammonia. Therefore, the mass flow rate of the exhaust gas, $\dot{m}_{RG}$, is given as follows:

H2O: 22.89%

N2: 76.00%

Ar: 1.11%

The combustion temperature $t_2 = T2 - 273.15$ K can be calculated by the following:

$$h_2 = h_{H_2O} + h_{N_2} + h_{Ar} = c_{H_2O} \cdot t_2 + c_{N_2} \cdot t_2 + c_{Ar} \cdot t_2 \tag{11}$$

Due to the overpressure, the boiling temperature of the water is 180° C. The enthalpy of the water vapor at the boiling point is 2778 kJ/kg. This must be taken into account accordingly. The combustion temperature is excessively high due to the stoichiometric fuel-air ratio (calculated at approx. 2400° C.). Therefore, the exhaust gas must be cooled immediately to prevent damage to the turbine and possibly the material of the combustion chamber. For cooling, water vapor is added to the exhaust gas flow.

Water Injection.

In this example, the water is injected into the exhaust gas at a temperature $t_W = 220°$ C. (see FIG. 6 below) and a pressure $p_W = 2000$ kPa. Enough water must be injected so that the temperature of the water-exhaust gas mixture does not exceed the operating temperature of the turbine and so that a high efficiency factor is guaranteed, $t_{RG, w} < t_{Tmax} = 1200°$ C. In addition, the temperature may only be selected high enough to allow the ammonia to evaporate downstream of the turbine using the energy of the exhaust gas and the water to be heated to the required temperature. The temperature of the exhaust gas should be significantly higher than the temperature of the injected water. For this example, computer calculations for varying the quantity of water to determine the optimized efficiency factor with respect to the selected parameters as a function of the quantity of water produce, for the water injection, an optimum mass fraction of w=74.37% injected water relative to exhaust gas. This is described in more detail below with reference to FIGS. 6 and 7. This results in the enthalpy of the exhaust gas-water mixture $h_{2,W}$ according to equation 12:

$$h_{2,w} = h_2 \cdot (1 - w) + h_w \cdot w, \tag{12}$$

As well as according to equation 13:

$$h_w = 2799 \frac{kJ}{kg} + (t_w - 212° \text{ C.}) \cdot 1.89 \frac{kJ}{kg \cdot K} = 2814.12 \frac{kJ}{kg} \tag{13}$$

(boiling temperature at the pressure for injection, here assumed to be 2000 kPa: 212° C.) according to equation 14:

$$h_{2,w} = h_2 + w \cdot (h_w - h_2) = 2977.77 \frac{kJ}{kg} \tag{14}$$

After the water is added, the temperature decreases accordingly. The turbine inlet temperature decreases and the mass flow rate increases as given by equations 15 to 17:

$$h_{2,w} = (w + (1 - w) \cdot 0.2289) \cdot \left(2778 \frac{kJ}{kg} + 1.89 \frac{kJ}{kg}(t_{2,w} - 180° \text{ C.})\right) + \tag{15}$$

$$(1 - w) \cdot \left(0.76 \cdot 1.009 \frac{kJ}{kg \cdot K} \cdot t_{2,w} + 0.0111 \cdot 0.524 \frac{kJ}{kg \cdot K} \cdot t_{2,w}\right),$$

$$h_{2,w} = 1879.79 \frac{kJ}{kg} \cdot w + 558.01 \frac{kJ}{kg} + \tag{16}$$

$$1.4574 \frac{kJ}{kg \cdot K} \cdot wt_{2,w} + 0.4326 \frac{kJ}{kg \cdot K} \cdot t_{2,w} + 0.7727 \frac{kJ}{kg \cdot K} \cdot (1 - w) \cdot t_{2,w},$$

-continued $$t_{2,w} = \frac{h_{2,w} - \left(1879.79\frac{kJ}{kg}w + 558.01\frac{kJ}{kg}\right)}{0.6847\frac{kJ}{kg \cdot K}w + 1.2053\frac{kJ}{kg \cdot K}} = 595.95° \text{ C.,}$$ (17)

The turbine inlet temperature of 595.95° C. results from the quantity of water to be fed in, which is determined for an optimized efficiency factor. This turbine inlet temperature at an optimized efficiency factor permits advantageous turbine designs compared to conventional turbines, which typically have to withstand significantly higher temperatures of around 1200° C. In addition, the turbine inlet temperature corresponds to the heat that can be recovered from the exhaust gas flow to preheat the fuel and to preheat the quantity of water to be added to the gas flow for the optimized efficiency factor calculated in this way for the aforementioned injection temperature of the water. This is also given below.

Turbine.

Due to the high temperature of the exhaust gas-water mixture, it can be assumed that the supercritical water vapor behaves approximately like an ideal gas. Therefore, the enthalpy after the turbine, $h_3$, is given by equation 18:

$$h_3 = h_{2,w} - \eta_T \cdot c_{P,RG,W} \cdot T_{2,w} \cdot \left(1 - \left(\frac{P_1}{P_2}\right)^{\frac{k_{RG,W}-1}{k_{RG,W}}}\right)$$ (18)

Where:

$\eta_T$: isentropic efficiency factor of the turbine, assumed to be 90%, $c_{P,RG,W}$: thermal capacity of the exhaust gas-air mixture, calculated from the mass fractions, $k_{RG,W}$: isentropic exponent of the exhaust gas-air mixture, calculated from the mass fractions, initially converted into molar fractions.

From equation 19:

$$c_{P,RG,W} = (w + (1-w) \cdot 0.2289) \cdot 1.89\frac{kJ}{kg \cdot K} +$$
$$(1-w) \cdot \left(0.76 \cdot 1.009\frac{kJ}{kg \cdot K} + 0.0111 \cdot 0.524\frac{kJ}{kg \cdot K}\right) = 1.716\frac{kJ}{kg \cdot K},$$

and equation 20:

$$k_{RG,W} = \frac{\left((w + (1-w) \cdot 0.2289) \cdot \frac{1}{18}\text{mol} \cdot k_{WaterVapor} + (1-w) \cdot \left(0.76 \cdot \frac{1}{14}\text{mol} \cdot k_{N_2} + 0.0111 \cdot \frac{1}{40}\text{mol} \cdot k_{Ar}\right)\right)}{(w + (1-w) \cdot 0.2289) \cdot \frac{1}{18}\text{mol} + (1-w) \cdot \left(0.76 \cdot \frac{1}{14}\text{mol} + 0.0111 \cdot \frac{1}{40}\text{mol}\right)} = 1.3146$$ (20)

It follows that equation 21:

$$h_3 = 2409.52\frac{kJ}{kg}$$ (21)

After passing through the turbine, the enthalpy is reduced accordingly and the temperature is decreased. The temperature of the exhaust gas can be determined in a similar way as the temperature before the turbine. However, it must be noted that due to the reduced pressure, the evaporation temperature is now 100° C., equations 22 to 24:

$$h_3 = (w + (1-w) \cdot 0.2289) \cdot \left(2677\frac{kJ}{kg} + 1.89\frac{kJ}{kg \cdot K}(t_3 - 100° \text{ C.})\right) +$$ (22)
$$(1-w) \cdot \left(0.76 \cdot 1.009\frac{kJ}{kg \cdot K}t_3 + 0.0111 \cdot 0.524\frac{kJ}{kg \cdot K} \cdot t_3\right),$$

$$h_3 = 1918.5\frac{kJ}{kg} \cdot w + 569.5\frac{kJ}{kg} + 1.4574\frac{kJ}{kg \cdot K} \cdot w \cdot t_3 +$$ (23)
$$0.4326\frac{kJ}{kg \cdot K} \cdot t_3 + 0.7727\frac{kJ}{kg \cdot K} \cdot (1-w) \cdot t_3$$

$$t_3 = \frac{h_3 - \left(1918.5\frac{kJ}{kg}w + 596.5\frac{kJ}{kg}\right)}{0.6847\frac{kJ}{kg \cdot K}w + 1.2053\frac{kJ}{kg \cdot K}} = 214.02° \text{ C.}$$ (24)

Calculation of the Efficiency Factor.

The efficiency factor can be calculated as in equation 3. For the calculation, the mass flow rates $\dot{m}_{BR}$, $\dot{m}_L$ and $\dot{m}_{RG,W}$ must be defined as a function of my:

$$\dot{m}_{BR} = 0.1626 \cdot \dot{m}_L$$

$$\dot{m}_{RG,W} = (\dot{m}_{BR} + \dot{m}_L) \cdot (1 + w/(1-w))$$

In addition, the following are assumed for equations 25 and 26:

$$\eta_{Generator} = 0.98$$ (25)

$$\eta_{mechanical} = 0.98$$

$$\eta_{el} = \frac{\eta_{Generator} \cdot \eta_{mechanical} \cdot (\dot{m}_{RG,W} \cdot (h_{2,w} - h_3) - \dot{m}_L \cdot (h_1 - h_0))}{\dot{m}_{Br} \cdot H_{Br}}$$

-continued $$\eta_{el} = \eta_{Generator} \cdot \eta_{mechanical} \cdot$$ (26)
$$\frac{\left(1.1626 \cdot \left(1 + \frac{w}{(1-w)}\right) \cdot (h_{2,W} - h_3) - (h_1 - h_0)\right)}{0.1626 \cdot H_{Br}} = 60.86\%$$

With respect to use in a motor vehicle with an assumed efficiency factor of the electrical components in the vehicle $\eta_F = 86\%$, this produces an overall efficiency factor for the drive of 52.34%.

Exhaust Gas.

After the exhaust gas with the enthalpy $h_3$ has left the turbine, additional energy is extracted from it by a heat exchanger. This is required to heat the injection water, vaporize the ammonia, and heat it to the injection temperature. The enthalpy of the exhaust gas has then decreased to $h4$ (not shown in FIG. 5), according to equations 27 and 28:

$$h_4 = h_3 - \left( w \cdot (2799 - 67)\frac{kJ}{kg} + w \cdot 1.89 \frac{kJ}{kg \cdot K} \cdot (t_W - 212° \text{ C.}) + \right. \tag{27}$$

$$\left. (1 - w) \cdot 0.1399 \cdot \left( h_4 + 1222\frac{kJ}{kg} \right) \right) = 306.81 \frac{kJ}{kg}$$

$$t_4 = \frac{h_4}{4.19 \cdot (w + (1 - w) \cdot 0.2289) +} = 86.18° \text{ C.} \tag{28}$$
$$(1 - w) \cdot (0.76 \cdot 1.009 + 0.0111 \cdot 0.524)$$

The analogous calculation for a turbine designed for LPG as fuel produces an optimized turbine efficiency factor of 71.18%. The corresponding overall efficiency factor for a truck powered by this fuel is therefore 61.21%.

With reference to the above calculation, FIG. 6 shows the dependence of the highest achievable efficiency, $\eta$, on the injected quantity of water, $w$ (given as the proportion of water in the exhaust gas), and the required temperature, $T_W$, of the injected water for a stoichiometric fuel-air mixture and an injection pressure of the water of 2000 kPa.

Two separate vertically shaded areas can be seen. The vertical lines represent a range of efficiency factors at the same proportion of water and varying water temperature. The interruption of some of the ranges of efficiency factors at the same proportion of water between approx. 45% and approx. 75%, resulting in separate shaded areas, is due to the possible phase transition of the injected water. The highest achievable efficiency factor is represented by the upper boundary of the entire shaded area. The curve of the water temperature corresponding to the highest efficiency factor during injection is superimposed on the efficiency factor diagram.

A minimum required proportion of water of approx. 30% results on one hand from the overheating of the turbine occurring with a stoichiometric mixture above the critical temperature, which is assumed here to be 1200° C., and the minimum water temperature of 0° C. If one follows the diagram in the direction of increasing proportions of water, both an increasing achievable efficiency factor and an increasing water injection temperature required for this efficiency factor can be seen. The efficiency factor is influenced by the exhaust gas heat used to preheat the water to the respective injection temperature and then recovered. Exhaust gas heat recovered and used to preheat the fuel is taken into account. In other examples of the invention, however, the fuel is at least partially preheated, or not preheated, with non-recovered, for example electrically generated heat. An increasing proportion of water in the lower range permits sufficient cooling even at a higher water injection temperature and thus with a higher proportion of recovered exhaust gas heat. The highest achievable efficiency factor therefore increases at the same time with an increasing water injection temperature.

The boiling point of the injected water is approximately 212° C. at the assumed injection pressure, which in this example is chosen to be twice as high as the pressure in the combustion chamber for the purpose of optimized injection. An increase in efficiency factor is correspondingly reduced over a range of the proportion of water of approx. 40% to approx. 45%, in which maximum efficiency factor is achieved due to the fact that the heat removal required to limit the turbine temperature to 1200° C. is partially caused by the phase change of the injected water. This is followed by a sharp increase in the achievable efficiency factor, in which the water is now completely vaporized, i.e., injected in gaseous form at a temperature above the boiling point. As the proportion of water continues to increase, the injection temperature for maximum efficiency factor also continues to increase.

With a proportion of water of approx. 55%, the highest efficiency factor is achieved at the so-called critical point. This is characterized by the fact that the recoverable exhaust gas heat is exactly sufficient for achieving the ideal water injection temperature for exactly this quantity of water. In conventional water injection processes in known gas turbines, for example, the STIG process, a proportion of water below the critical point is therefore used.

A particularly advantageous embodiment of the invention is based on the surprising finding that the highest achievable efficiency factor using exhaust gas heat recovery continues to increase with proportions of water above the critical point, although following a different rule. In FIG. 6, this can be seen by the flat rising curve of the highest achievable efficiency factor for proportions of water above the critical proportion of water of approx. 55% and by a simultaneous drop in the temperature of the injection water. The drop in the water temperature results from the fact that the recoverable exhaust gas heat is accounted for by an increasing proportion of water. An overall maximum efficiency factor, which is approx. 60% in the example in FIG. 6, can be achieved if the temperature of the injected water that can be preheated with the exhaust gas heat is just above the evaporation temperature. In the example shown, this corresponds to a proportion of water of approx. 75%.

As shown in FIG. 6 and described above, the efficiency of the gas turbine 102 is at a maximum when using only recovered exhaust heat to preheat both the quantity of water and the fuel and preheating the quantity of water such that both the fuel and the largest possible quantity of water is vaporized by the preheating. As can be seen from FIG. 6, however, advantages of the invention with respect to conventional gas turbines can also be achieved under different operating conditions of the gas turbine 102. This applies in particular to operation of the gas turbine 102 with any proportion of water above the critical point up to the maximum efficiency factor. As can be seen in FIG. 6, a higher efficiency factor can be achieved with any proportion of water in this range than with conventional gas turbines. This allows the efficiency factor to be optimized within this range, depending on the conditions or other requirements relating to the design and/or operation of the gas turbine 102, whereby an advantage over conventional gas turbines in terms of efficiency factor can always be achieved. An optimized efficiency factor, i.e., when operating between the critical point and the maximum achievable efficiency factor, is for example always at least 84%, in preferred examples at least 90% of the maximum efficiency factor.

In advantageous examples of the gas turbine systems as described in connection with FIGS. 1 to 5, the control unit 190 is accordingly designed to control the proportion of water in the gas flow on the basis of the aforementioned rules in accordance with an optimal, for example, maximum achievable, efficiency factor, in particular above the critical point.

For further illustration, FIG. 7 shows the respective ranges of the resulting turbine inlet temperature, TT, for respective proportions of water in the exhaust gas, w. The vertical lines each correspond to a possible temperature range of the gas flow at the turbine inlet for a given proportion of water at a variable water injection temperature. The possible turbine inlet temperature is limited at the top by the critical temperature of 1200° C. It can also be seen that from the critical point at a proportion of water of approx. 55%, the maximum temperature of the gas flow begins to fall below the critical temperature due to the increased proportion of water in relation to the recoverable exhaust gas heat. The end of this down-ward gradient, in the example shown at a proportion of water of approx. 75% and a turbine inlet temperature of approx. 600° C., again corresponds to operation at maximum efficiency factor, as explained above in connection with FIG. 6.

The example described with reference to FIGS. 5 to 7 relates to operation of the presented gas turbine system with a stoichiometric fuel-air mixture that is particularly advantageous for a maximum efficiency factor, with the use of ammonia as a fuel, which is advantageous with respect to the development of pollutants, and with pressure ratios typical for turbines. However, the advantages described above can also be achieved at least in part with different operating conditions. This applies, for example, to the use of a different fuel, a different combustion chamber pressure, and/or a different fuel-air mixture that would conventionally lead to overheating of the turbine. Even in such cases, an optimized efficiency factor can be achieved with a quantity of water in the exhaust gas above the critical point.

The invention claimed is:

1. A method for operating a gas turbine system, the gas turbine system comprising a gas turbine and a control unit, wherein the gas turbine comprises at least one turbine wheel, at least one combustion chamber provided for combustion of a fuel-air mixture in the at least one combustion chamber and being in fluidic connection with the at least one turbine wheel for channeling a gas flow out of the at least one combustion chamber to the at least one turbine wheel, and at least one water injection assembly, which is constructed to feed water to the gas flow, wherein:

the gas turbine is constructed to be operated in a first provided operating mode with a first fuel-air mixture, in which a resulting generated gas flow has a temperature that is suitable for producing a temperature in an area of the at least one turbine wheel that is greater than a critical temperature of the at least one turbine wheel, wherein the method comprises:

receiving, by the control unit, at least one input signal that indicates a temperature in the area of the at least one turbine wheel;

generating, by the control unit, a control signal for controlling a quantity of water, which is fed to the gas flow by the at least one water injection assembly to generate a resulting generated water-gas mixture, such that a temperature of the resulting generated water-gas mixture in the area of the at least one turbine wheel is less than the critical temperature of the at least one turbine wheel and greater than a threshold temperature value, wherein the threshold temperature value is determined at least partially by a temperature of the resulting generated water-gas mixture that is required for preheating water, supplied to the at least one water injection assembly, using an exhaust gas heat recovery heat exchanger; and outputting, by the control unit, the control signal to the at least one water injection assembly.

2. A computer-readable storage medium having stored thereon program code for execution by a programmable processor device of a control unit of a gas turbine system, the gas turbine system comprising a gas turbine, wherein the gas turbine comprises at least one turbine wheel, at least one combustion chamber provided for combustion of a fuel-air mixture in the at least one combustion chamber and being in fluidic connection with the at least one turbine wheel for channeling a gas flow out of the at least one combustion chamber to the at least one turbine wheel, and at least one water injection assembly, which is constructed to feed water to the gas flow, wherein the gas turbine is constructed to be operated in a first provided operating mode with a first fuel-air mixture, in which a resulting generated gas flow has a temperature that is suitable for producing a temperature in an area of the at least one turbine wheel that is greater than a critical temperature of the at least one turbine wheel, wherein, when the program code is executed by the programmable processor device, the control unit is caused to:

receive at least one input signal that indicates a temperature in the area of the at least one turbine wheel;

generate a control signal for controlling a quantity of water, which is fed to the gas flow by the at least one water injection assembly to generate a resulting generated water-gas mixture, such that a temperature of the resulting generated water-gas mixture in the area of the at least one turbine wheel is less than the critical temperature of the at least one turbine wheel and greater than a threshold temperature value, wherein the threshold temperature is determined at least partially by a temperature of the resulting generated water-gas mixture that is required for preheating water, supplied to the at least one water injection assembly, using an exhaust gas heat recovery heat exchanger; and output the control signal to the at least one water injection assembly.

3. A gas turbine system for operating an electrical generator in an electric-powered motor vehicle, the gas turbine system comprising:

a gas turbine; and a control unit, wherein:

the gas turbine comprises at least one turbine wheel and at least one combustion chamber provided for combustion of a fuel-air mixture in the at least one combustion chamber and being in fluidic connection with the at least one turbine wheel for channeling a gas flow out of the at least one combustion chamber to the at least one turbine wheel, the gas turbine comprises at least one water injection assembly, which is constructed to feed water to the gas flow, the control unit is constructed to control a quantity of water that is fed to the gas flow by the at least one water injection assembly to generate a resulting generated water-gas mixture, the gas turbine is constructed to operate, in a first provided operating mode, with a first fuel-air mixture, in which a resulting generated gas flow has a temperature that is suitable for causing a temperature in an area of the at least one turbine wheel that is greater than a critical temperature of the at least one turbine wheel, and the control unit is constructed to control the quantity of water such that a temperature of the resulting generated water-gas mixture in the area of the at least one turbine wheel is less than the critical temperature of the at least one turbine wheel and greater than a threshold temperature value, wherein the threshold temperature value is determined at least partially by a temperature of the resulting generated water-gas mixture that is required for preheating water, supplied to the at least one water injection assembly, using an exhaust gas heat recovery heat exchanger.

4. The gas turbine system according to claim 3, wherein a water injection area (Bw) of the at least one water injection assembly is arranged with reference to the at least one combustion chamber such that a combustion process of the gas turbine is at least 60% complete before the gas flow enters the water injection area.

5. The gas turbine system according to claim 3, wherein the first fuel-air mixture is substantially stoichiometric.

6. The gas turbine system according to claim 3, wherein the threshold temperature value is determined at least partially by a temperature of the resulting generated water-gas mixture that is required for preheating of a fuel for the gas turbine and/or for operating an exhaust-gas cleaning device of the gas turbine system.

7. The gas turbine system according to claim 3, further comprising at least one sensor configured to detect at least one measurement parameter that indicates a temperature in the area of the at least one turbine wheel, wherein the control unit is configured to control the quantity of water based at least partially on the detected at least one measurement parameter.

8. The gas turbine system according to claim 7, wherein the at least one sensor comprises a temperature sensor that is arranged in the area of the at least one turbine wheel or downstream of the area of the at least one turbine wheel and the control unit is configured to control the quantity of water based at least partially on a temperature detected by the temperature sensor.

9. The gas turbine system according to claim 7, wherein the at least one sensor comprises a nitrogen oxide sensor and the control unit is configured to control the quantity of water based at least partially on a signal of the nitrogen oxide sensor.

10. The gas turbine system according to claim 3, wherein the control unit is further configured to control the quantity of water based at least partially on a fuel flow rate of the gas turbine, an air flow rate of the gas turbine, a mixture ratio of the fuel-air mixture with which the gas turbine is operated, a composition of exhaust gas produced by the at least one combustion chamber, and/or a pressure within the at least one combustion chamber.

11. The gas turbine system according to claim 3, wherein the control unit is further configured to control the quantity of water such that an efficiency of the gas turbine is optimized based on the quantity of water.

12. The gas turbine system according to claim 11, wherein the efficiency of the gas turbine is optimized with respect to at least one processing parameter of an operating process in the at least one combustion chamber.

13. The gas turbine system according to claim 12, wherein the at least one processing parameter is an injection temperature of the water fed to the gas flow by the at least one water injection assembly at an inlet into the at least one combustion chamber, and the threshold temperature value corresponds substantially to a temperature of the resulting generated water-gas mixture required for preheating at least the quantity of water to the injection temperature.

14. The gas turbine system according to claim 13, wherein the threshold temperature value is further based on a temperature of the resulting generated water-gas mixture that is required for preheating a fuel.

15. A motor vehicle comprising the gas turbine system according to claim 3.

16. The motor vehicle according to claim 15, further comprising at least one electric drive and an electric generator that is provided for generating power for the at least one electric drive, wherein the gas turbine system is arranged for operating the electric generator.

17. The motor vehicle according to claim 16, further comprising at least one electric energy storage device that is configured to store electrical energy generated by the electric generator and to provide stored electrical energy to the at least one electric drive.

* * * * *